Oct. 30, 1951           G. W. BALL           2,572,834

HYDRAULIC VARIABLE SLIP COUPLING

Filed June 11, 1946           3 Sheets-Sheet 1

GEORGE W. BALL

Oct. 30, 1951     G. W. BALL     2,572,834
HYDRAULIC VARIABLE SLIP COUPLING
Filed June 11, 1946     3 Sheets-Sheet 2

Inventor
GEORGE W. BALL

Attorney

Oct. 30, 1951      G. W. BALL      2,572,834

HYDRAULIC VARIABLE SLIP COUPLING

Filed June 11, 1946      3 Sheets-Sheet 3

Inventor

GEORGE W. BALL

By F. J. Schmitt

Attorney

Patented Oct. 30, 1951

2,572,834

UNITED STATES PATENT OFFICE 2,572,834

HYDRAULIC VARIABLE SLIP COUPLING

George W. Ball, Hartford, Conn.

Application June 11, 1946, Serial No. 676,044

9 Claims. (Cl. 74—688)

(Granted under the act of March 3, 1883, as amended April 30, 1928; 370 O. G. 757)

This invention relates to a novel form of variable slip multi-stage hydraulic coupling.

The conventional "Fottinger" kinetic hydraulic coupling comprises two rotatable elements, a driver element and a driven element. For multistage operation in driving superchargers, fans or blowers, two or more of such units must be arranged so that each unit drives through a separate gear train to a common shaft. To prevent power feed-back, such arrangements must be provided with special quick acting valves with means for accurately timing their actuation in order to prevent fluid entering any unit except the one carrying the load. These requirements must necessarily be the basis of all designs or arrangements utilizing the "Fottinger" fluid coupling for multi-stage operation. Circulation of air in evacuated coupling units results in unpreventable "feed-back" losses. Such objectional characteristics as speed surges and momentary loss in drive are difficult to prevent when mechanical shifter valves are used, and are particularly objectionable in aircraft power plants. In the conventional arrangements, the coupling units are driven at different speeds and usually drive a common shaft by different diameter gears. Such arrangements inherently require excessive space.

In this application two coupling units are constructed in tandem making a two stage unit. This coupling unit is unique in that the first stage driver is integral with the second stage runner and therefore is driven hydraulically when the second stage is in operation. Due to this intimate arrangement, the second stage chamber can receive fluid directly from the first stage through appropriately located overflow passages and the entire unit can be supplied through a single valveless fluid passage. The coupling components are in fact hydraulically in series. Advantages over conventional arrangements include: compactness, decreased weight, simplicity of control, elimination of feed-back losses and increased reliability due to the elimination of mechanical valves. The coupling output or load is varied by merely regulating the mass flow of fluid in the single supply passage by means of any conventional hydromechanical regulator device. Such devices are available which are sensitive to changes in density, pressure, speed or temperature. In this application, two-stage operation is obtained by only three rotating elements since the first-stage driver and the second-stage runner are combined into one integral rotating element. Completely variable slip in both stages is obtained by varying the fullness of the unit as determined by the fluid flow balance between the coupling vents and the supply.

An object of this invention is to combine such two-stage variable slip hydraulic coupling with planetary or spur gear drives for driving variable speed devices such as engine superchargers, airplane cabin superchargers, fans or constant speed devices if controlled by a hydromechanical speed governor.

More specifically an object is to combine such two-stage variable slip hydraulic coupling with a planetary system wherein the runner of the first stage is provided with an integral rotatable ring gear for driving planetary pinions mounted on a rotatable planetary spider and in turn meshing with a sun gear mounted on the driven member. The driver of the second stage is provided with a gear by which it is driven at a higher speed ratio than the first stage driver. The first stage driver is gear driven through an overrunning clutch so that its speed may be increased over that which it normally obtains from its gear drive. This increased speed is obtained by torque transmission by the second stage driver to the second-stage runner which is integral with the first-stage driver. The loading of the second stage is controlled by the volume overflow of fluid received from the first stage.

Another object is to combine such two-stage variable slip hydraulic coupling with a planetary gear system wherein the runner of the first stage is provided with a sun gear for driving planetary pinions mounted on a rotatable planetary spider and meshing with a stationary ring gear, the spider being keyed to or integral with the driven member, and wherein the second stage driver is driven at a higher speed than the first stage driver, the first stage driver being driven through an overrunning clutch so that its speed may be increased by the second stage driver when the second stage is placed into operation by increased fullness of the second stage due to a controlled overflow of fluid from the first stage.

Another object is to provide the rotatable ring gear runner of a planetary gear such as defined in the penultimate paragraph above, with a roller one-way lock to prevent its free rotation with respect to the driver thereby providing direct drive from the main drive shaft through the planetary system to the driven member accomplishing a minimum operating speed ratio when the fluid supply through the coupling is shut off.

Another object is to provide the first stage driver of couplings such as defined above with a normally released clutch member for cooperation with a shoe integral with the first stage runner and means for locking these members together in response to operation of the second stage.

Another object is to provide the two-stage variable slip hydraulic planetary drive defined above with both features specified in the two preceding paragraphs.

The use of variable slip two-stage couplings as defined above is not necessarily limited to cooperation with planetary gear systems as will become apparent in the following detailed description of illustrative devices based on the present invention, having reference to the accompanying drawings, wherein.

Figure 1:
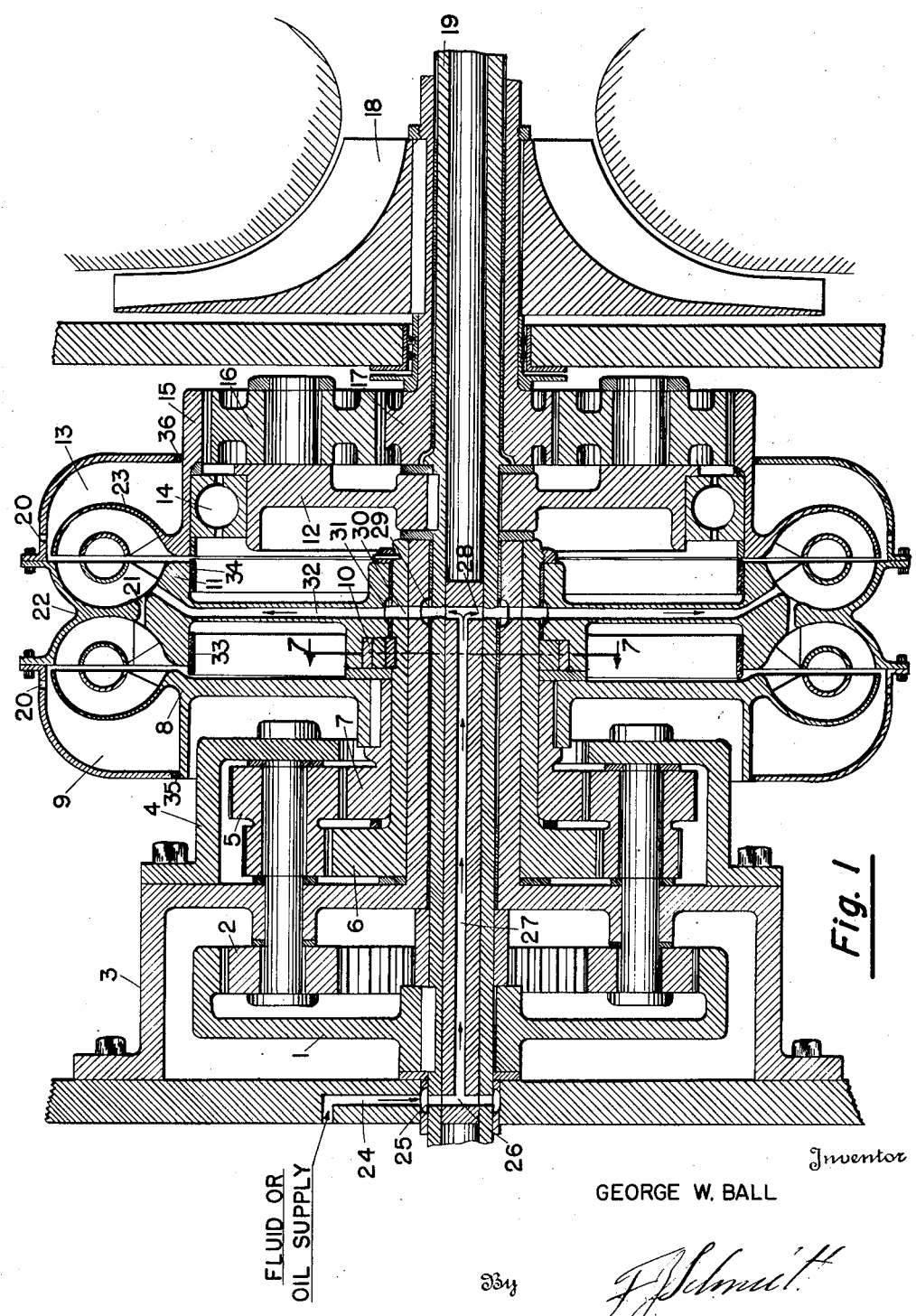
Fig. 1 is a sectional view of the two-stage variable slip hydraulic coupling combined with a planetary gear system to drive a supercharger.
Figure 2:
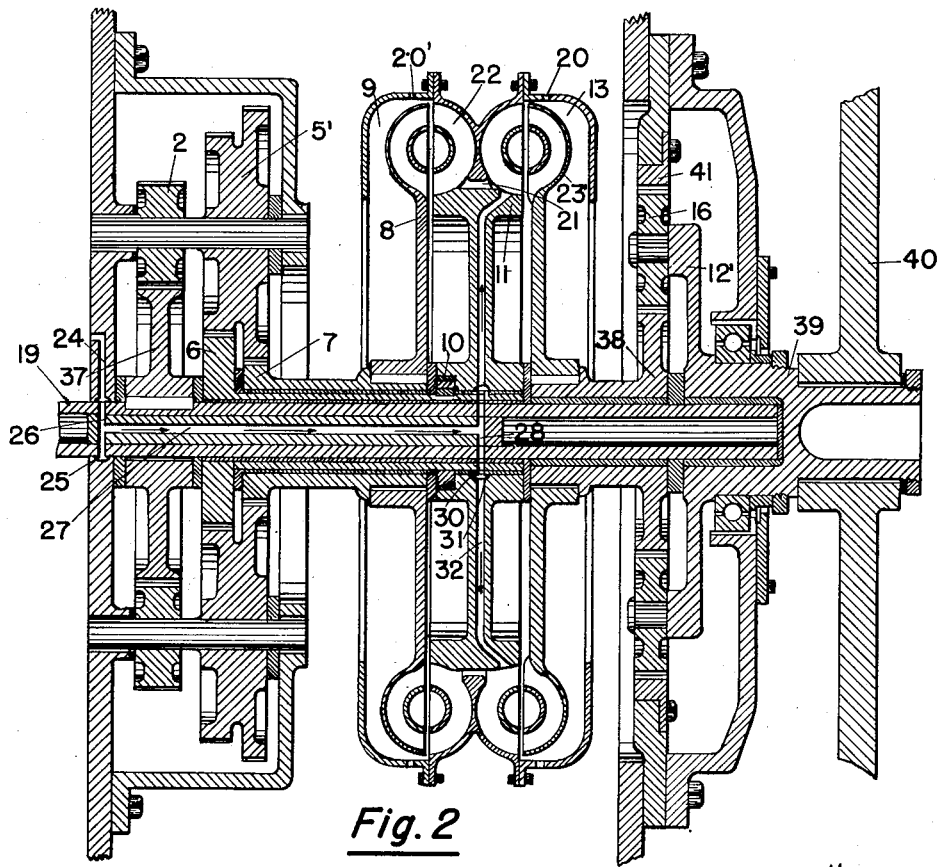
Fig. 2 is a similar sectional view of the two-stage variable slip hydraulic coupling combined with a planetary reduction gear system for driving a fan.
Figure 7:
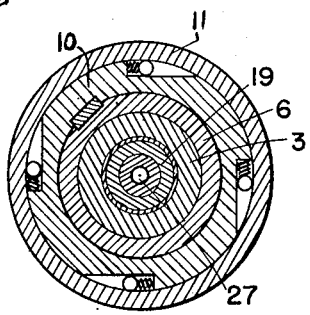
Figure 4:
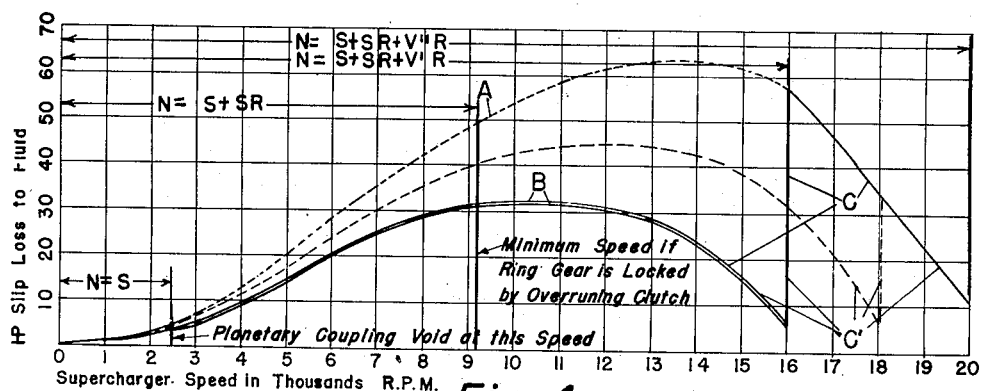
Figure 5:
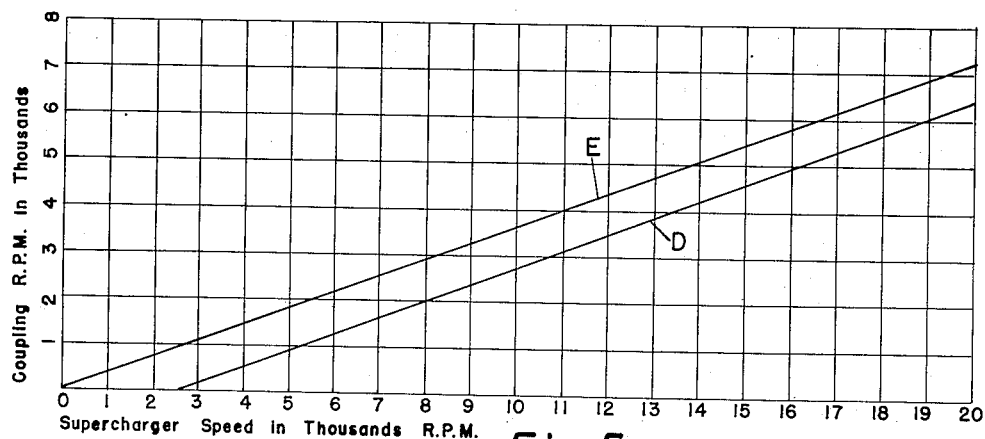
Figure 6:
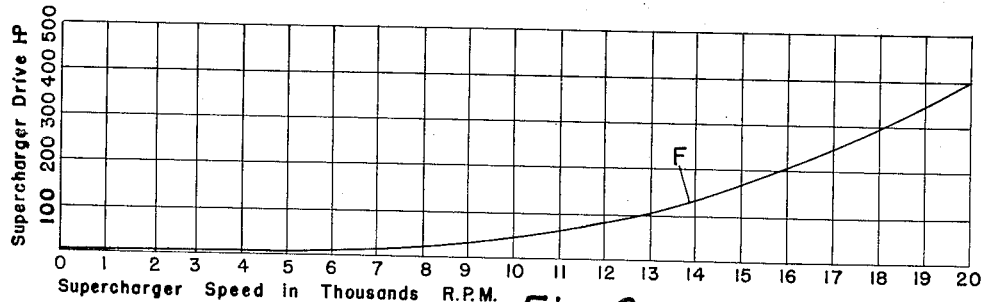
Figure 8:
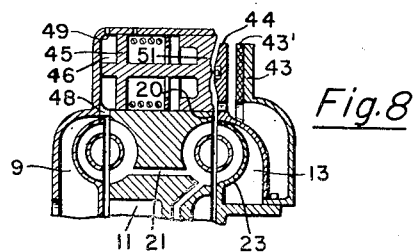

Figs. 4, 5 and 6 are calculated characteristic curves illustrating the operation of this type of coupling as applied to a supercharger which is assumed to require 400 horsepower at 20,000 R. P. M., the planetary system having a gear ratio of 2.7 to 1;

Fig. 7 is a sectional view of the roller one-way clutch taken on line 7—7 of Fig. 1; and Fig. 8 is a partial detailed sectional view of a two-stage hydraulic coupling similar to Fig. 2, provided with an automatic controllable clutch.

As normally used for driving superchargers, the Fottinger kinetic coupling is utilized as a hydraulic clutch operating at minimum slip and cooperating between driving and driven members. Only a single speed ratio is possible if the fullness of the coupling is not varied. Staging may be accomplished by adding additional coupling. However, each must drive the common driven member through a separate gear train and contain provision for shutting off the fluid supply when not carrying the load. Such arrangements are exemplified in Patents 2,415,760 to Porter, Italian patent to Daimler-Benz No. 366,358, and Patent 2,385,834 to Nallinger.

If variable slip operation is desired, it also is necessary to provides means for varying the fullness of each unit when in operation. The complicated valve mechanisms required to accomplish multi-stage operation with the above arrangements and related difficulties generally preclude their use for driving such devices as engine superchargers, cooling fans or cabin superchargers.

Figure 3:
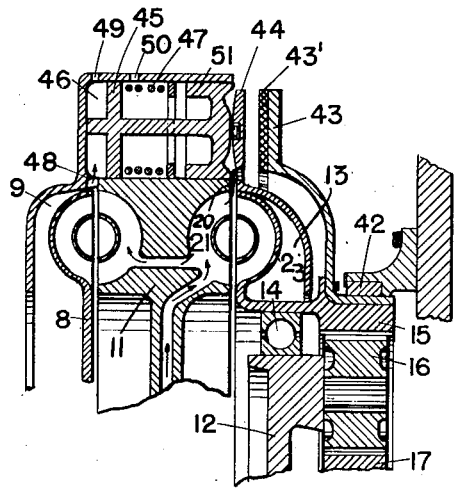
Fig. 3 is a partial detailed sectional view of a two-stage variable slip hydraulic coupling similar to that in Fig. 1, provided with a roller one-way clutch lock for the rotatable ring gear, and an automatically controlled clutch means between the first stage driver and runner.

The device in the present disclosure is essentially a modification of the conventional coupling whereby two-stage operation is accomplished with the elimination of mechanical valves normally required for operating successively. No two-stage variable slip coupling arranged in tandem, so that the two drivers are in series hydraulically, has been previously used. The type of coupling described herein is, of course, not necessarily limited to two stages and may be used in conjunction with any configuration of gearing forming a gear drive. The devices illustrated in the figures of the drawings include a two-stage variable slip coupling in combination with a planetary gear drive in Fig. 1 for driving a supercharger, and a similar coupling in combination with a planetary gear drive in Fig. 2 for driving a fan. The additional features of a roller one-way lock for the rotatable ring gear, and automatic clutch means between the first stage runner and the first stage driver are illustrated in Fig. 3. The one way lock and automatic clutch means are refinements not essential for the operation or utility of the coupling.

Referring to Fig. 1, the first stage driver 11 is driven through a one-way roller clutch 10 by drive gear 6 from double drive gears 5. Second stage driver 8 is driven at a relatively higher speed by drive gear 5 through gear 7. Drive gears 5 are operated by intermediate pinions 2 driven by the main coupling drive gear 1 which is mounted on main drive shaft 19. The pinion shafts are mounted in bearings in the coupling drive support housing 3 and coupling drive pinion support housing 4. Thus the first stage driver 11 and second stage driver 8 are rotated in a direction counter to the main drive shaft 19 and at relatively different speeds. The first stage runner 23 is attached to or integral with a ring gear 15 which meshes with planetary pinions 16 mounted on a spider 12 keyed to drive shaft 19. Pinions 16 mesh with the sun gear 17 which is connected to drive the supercharger 18. The operating fluid is supplied to passage 24, the annular groove 25, passages 26, 27 and 28 in the drive shaft 19, annular groove 29, passages 30 in the drive gear 6, annular groove 31 and passages 32 in the first stage driver to the first stage fluid chamber 13 for operation of the first stage unit 11, 23. Calibrated bleeds 20 and 20' provide for continual withdrawal of the operating fluid from each stage, the slip being varied by varying the supply of fluid. By further increasing the supply of operating fluid to the first stage fluid chamber 13 after the first stage runner 23 has attained its minimum slip with respect to the first stage driver 11, the operating fluid may be caused to overflow from the first stage fluid chamber into the second stage fluid chamber 9 through overflow passages 21. When chamber 9 is sufficiently full, the second stage driver 8 will impart a driving torque, due to its higher speed of rotation to the first stage driver 11, thus increasing its speed as permitted by the overrunning clutch 10. This increase in speed will be imparted to the first stage runner 23 since its slip with respect to driver 11 is at a minimum, and, as a result, the speed of the supercharger 18 also is proportionately increased. Maximum speed is obtained when the supply of fluid is maintained sufficiently to cause operation at minimum slip between driver 8 and driver 11.

Sealing members 33 and 34 are shown between the driver 11 and driver 8 and runner 23, and sealing means 35 and 36 are provided on the sides of fluid chambers 9 and 13, respectively. These sealing means, however, may be omitted because the centrifugal force acting on the fluid in the fluid chambers will maintain it in the outer periphery of these chambers and will normally prevent its escape through these openings. A planetary ring gear support bearing 14 is provided between the spider 12 and the planetary ring gear 15.

In Fig. 2, a similar variable slip hydraulic coupling is shown combined with a planetary gear drive wherein the first stage driver 11 is provided with a drive gear 6 and the second stage driver 8 is provided with a gear 7 driven by double pinions 5' as in Fig. 1 by the intermediate pinions 2 which are driven by gear 37 mounted on the main drive shaft 19. The first stage runner 23' in this case is provided with a sun gear 38 (instead of the ring gear 15 of Fig. 1) for driving the planetary pinions 16 mounted on a spider 12' which in this case, is attached to or integral with the fan shaft 39 for driving the fan 40. The planetary pinions 16, in this case, mesh with a stationary ring gear 41.

In the first of the above devices as shown in Fig. 1, the ring gear 15 may be further provided with a roller one-way brake lock 42, and also with one member 43 of a ring clutch, the other ring member 44 of this clutch being operated into clutching position by plungers 45 operating in fluid chambers 46 spaced at equal intervals around the periphery of the first stage driver. The plungers 45 being normally retracted into clutch release position by springs 47. These fluid chambers are connected by relatively large openings 48 to the second stage fluid chamber 9 and the bleeds 20' for fluid chamber 9 are in this case omitted and are substituted by bleeds 49 in the plunger fluid chambers 46. Vents 50 are provided in the plunger cylinders for relief purposes.

In a planetary system in which the ring gear is locked and the spider driven, the R. P. M. of the sun gear is $N=S+SR$ where S is the R. P. M. of the spider and R is the ratio of the teeth on the ring gear to the teeth on the sun gear. However, if the ring gear is mounted on a bearing and driven in a direction counter to that of the spider, a further increase in the R. P. M. of the sun gear will be obtained, this increase being proportional to VR where V is the R. P. M. of the ring gear. The R. P. M. of the sun gear then becomes $N=S+SR+VR$. If the ring gear is not driven, there is no relative motion of the components of the planetary, and $V=S$ and $N=S$.

In the following description of the operation of the device of Fig. 1, V' denotes the R. P. M. of the runner 23 when in first stage operation and V" denotes the R. P. M. of runner 23 when in second stage operation.

Such a planetary system is particularly adapted for driving high speed devices such as superchargers when combined with a variable slip coupling. The coupling proposed in this application is particularly adapted for cooperation with such planetary system as shown in Fig. 1. Referring to Fig. 1, with the coupling void of fluid, the planetary system including 23, 15, 12, 16, 17 and the supercharger 18 rotate with the main drive shaft 19. Except as caused by friction and the resistance of the supercharger 18, there would be no relative motion between gears 15, 16 and 17.

When the operating fluid is introduced through passage 32 into the first stage fluid chamber 13, driver 11 imparts kinetic energy to the fluid and directs it against the runner 23, so that the speed of runner 23 is gradually reduced because the runner 23 no longer rotates freely in response to the drive from member 12 keyed to drive shaft 19.

The retarding of the free rotation of the runner 23, which is integral with ring gear 15, results in relative motion between the planetary gear components 15, 16 and 17, causing an increase in speed of the supercharger 18 in the same direction as the main drive shaft 19. Upon further increase in the supply of fluid, the runner 23 is retarded until rotation ceases. At this condition the supercharger 18 R. P. M. is $N=S+SR$, as defined above. Upon further increase in the supply of fluid, the slip between driver 11 and runner 23 is further reduced resulting in runner 23 being rotated in the same direction as driver 11, thereby further increasing the R. P. M. of the supercharger. Upon increasing the fullness until minimum slip is obtained, the supercharger 18 will have attained a speed of $N=S+SR+V'R$ where V' is the R. P. M. of runner 23 or ring gear 15. Upon further increasing the supply of fluid to overcome the escape through bleed 20, overflow through passages 21 into chamber 9 will be accomplished. When this chamber is sufficiently filled, the second stage driver 8 imparts kinetic energy to the fluid and directs it against the runner vanes 22, which are integral with the driver 11 thereby imparting a driving torque sufficient to cause driver 11 to rotate at a speed higher than permissible by drive gear 6. This increased speed of driver 11 is permitted by the overrunning clutch 10. Since the slip between driver 11 and runner 23 is at a minimum, this increased speed will be transmitted to runner 23 resulting in increased relative motion between the planetary components 15, 16 and 17, and a further increase in the speed of the supercharger 18. Upon increasing the fullness of chamber 9, minimum slip between driver 8 and driver 11 will be obtained. The maximum R. P. M. of the supercharger 18 is $N=S+SR+V''R$ where V" is the R. P. M. of the runner 23 and ring gear 15. It will be seen that V" is equal to the R. P. M. of driver 8 minus the sum of the slips between drivers 8 and 11, and driver 11 and runner 23. A reduction in supercharger speed is effected by the reduction in the supply of fluid. Since the escape of fluid from chamber 9 is provided by bleed 20', and the supply of fluid to chamber 9 is by overflow from chamber 13 through passages 21, it is clear that any reduction in total fluid supply will result in a decrease in the fullness of chamber 9 and an increase in slip between driver 8 and driver 11, and consequently a decrease in the value of V" and speed of supercharger 18. Upon further reduction in the supply of fluid, chamber 9 will subsequently become void and driver 11 will again be driven through gear 6 and roller clutch 10. Upon further reduction in fluid the slip between the driver 11 and runner 23 further increases until rotation of runner 23 and ring gear 15 ceases. At this condition $V'=O$ and the speed of supercharger 18 is $N=S+SR$. Upon further reduction in the supply of fluid, the slip increases further causing runner 23 to begin rotating in the same direction as drive shaft 19. The value of V' then becomes negative and, when the chamber 13 is void of fluid, equal to the value of S when there is no relative motion between the planetary components 15, 16 and 17. Since at this point V'R cancels SR the speed of the supercharger 18 theoretically becomes $N=S$. It should be clear to those familiar with the art that completely variable speed is permissible and controllable in the supercharger speed range between $N=S$ and the maximum design speed.

The operation of the device as shown in Fig. 2 is similar to that of the device of Fig. 1, and has the same advantageous characteristic of smooth transition between stages without the use of mechanical valves. However, in this application, the direction of rotation of the drivers 8 and 11 is immaterial, since the coupling runner 23 merely rotates the sun gear 38 of a planetary reduction drive consisting of fixed ring gear 41 and planetary pinions 16 mounted on spider 12 which in turn is connected to fan shaft 39.

In order to positively eliminate the slip between driver 11 and runner 23 a clutch device such as shown at 43—44 in Fig. 3 may be incorporated. This device may include a minimum of three plunger cylinders or fluid chambers 46 containing fluid operated spring-returned plungers 45 located at the periphery of driver 11. The axes of these cylinders or chambers are parallel with the axis of rotation of the coupling and are equally spaced around the periphery. The ends of the plungers 45 operate against a clutch ring 44 which is pressed against a facing 43' attached to a ring 43 which in turn is attached to or integral with the ring gear 15 or driven member 23 of the first stage. In this application the second stage bleeds 20' are replaced by bleeds 49 in the plunger cylinder. The operating fluid is supplied through relatively large supply passages 48 to the plunger cylinders from fluid chamber 9. The first stage bleeds 20 are so located, in this case, that the plunger guides 51 override these bleeds thereby shutting off the fluid escape when the plungers are actuated. Since the transition from the first stage operation to second stage operation is accomplished by increasing the fluid flow to the chamber 13 until the fluid overflows through passages 21 into chamber 9, the plunger chambers 46 will be filled, causing the plunger guides 51 to override the first stage bleeds 20. The total fluid flow then passes into the second stage fluid chamber 9 thereby accelerating the filling of the plunger chambers 46. Due to the speed of rotation, sufficient dynamic fluid pressure will be available to cause the plungers 45 to move against the force of springs 47 and press clutch ring 44 against facing 43' thereby locking or clutching together driver 11 and runner 23. This engagement will take place without shock since the minimum slip for couplings of this type is only approximately 2.5% to 3%. While not essential to operation, the use of the clutch device will accelerate the transition from the first or low to the second or high stage, and will eliminate the 2.5% to 3% slip loss in the first stage during the time the second stage is in operation. Since the slip in the first stage is eliminated, there will be no heat added to the fluid in passing from the first into the second stage chamber 9. The total fluid flow after operation in the second stage has been initiated, will not have to be much more than that necessary for operating in the second stage since the first stage bleeds 20 will be sealed off. Operation in the second stage will, of course, result in higher speed of rotation of driver 11 and consequently higher dynamic fluid pressure in chambers 46 will be available.

In the use of these couplings for main stage superchargers, using spinner fuel injection or for other reasons, it may be desirable to constrain the ring gear 15 of the planetary drive system (Fig. 1) from rotating with drive shaft 19 in order to satisfy a minimum speed requirement. A means of accomplishing this is the provision of a free-wheeling brake, or roller one-way brake lock, as shown at 42 in Fig. 3. This will prevent the initial rotation of the ring gear 15 and first stage runner 23 in the direction of operation of the accessory drive shaft 19, and will result in a minimum speed of the supercharger 18 in accordance with the expression $N=S+SR$ (as previously defined) in response to operation of the drive shaft 19. This minimum speed of the supercharger 18 will be maintained until the coupling takes effect to drive the runner 23 and ring gear 15 counter to the direction of drive shaft 19 thereby increasing the supercharger 18 speed further, as previously described.

The advantages in the use of the above hydraulic coupling means may be enumerated as follows:

1. The drive can be compactly designed, thereby saving weight and space.

2. The coupling unit can be enclosed by a fluid collector allowing the use of a fluid system independent of the engine oil system, and the possible use of low viscosity non-sludging fluid.

3. Automatic control is simplified by the use of the single fluid supply passage since it is not necessary to time and control the fluid flow to each stage independently.

4. Since the unit can be centrally located within the engine, couplings of relatively large diameter can be used. This permits the use of relatively low coupling rotational speeds, resulting in lower stresses and windage losses. It will be noted that the power transmitting capacity of a kinetic fluid coupling is proportional to the cube of the driving speed and the 5th power of the diameter ($HP=N^3D^5C$, where C is a design constant, N is the R. P. M. of the runner, and D is the effective diameter of the peripheral fluid chamber).

5. The design allows considerable latitude in the choice of speed ratios of the various components and the percentage of power to be carried by each stage depending upon design requirements.

6. Since mechanical valves required by successive operation of the stages are eliminated, the transition between stages will be smoother and more reliable than obtained with conventional couplings.

7. The power or driving torque resulting from air circulation through the coupling units when empty of fluid does not result in "drag" of any component of the coupling drive. Air circulates in kinetic couplings in the same manner as fluid, thereby resulting in a torque being transmitted from the driver to the runner. While this load is small, as it is proportional to the density of air as compared to fluid, it may result in losses of considerable magnitude in large couplings.

8. In conventional arrangements for multistage operation, although the fluid is shut off from couplings not carrying the load, the runners of such units being attached to the common driven element actually rotate at some higher speed than the drivers resulting in a feed-back loss. In the design proposed in this application, such feedback loss does not occur since "air load" in either stage drives the driven member. In conventional arrangements, feed back power must be supplied by the higher stage coupling in addition to the normal requirement usually resulting in over stressing the high stage components.

The curves, Figs. 4 to 6, are all based on the same abscissae of supercharger speeds from 0 to 20,000 R. P. M., Fig. 4 using the horsepower loss due to slip for the ordinates, Fig. 5, the required speed of the coupling runner in this application (Fig. 1) as compared to conventional arrangements; and Fig. 6, the horsepower assumed to be required to drive the supercharger.

Curve A in Fig. 4 shows the horsepower loss which would occur if only one stage of a particular hydraulic coupling, such as the first stage illustrated, were used throughout the entire range of speeds. Curve B indicates the loss for a single stage coupling, such as the first stage illustrated, when used for a lower range of speeds, whereas curve C results from the use of two stages in combination as in the illustrated device, showing the overall reduction in slip losses over those obtained with a single stage for the entire range of speeds as indicated by the curve A. Curve C' represents a further reduction in losses when three stages are utilized. The double line at B represents two curves, one for the coupling such as used for the first stage of the illustrated device and one for a similar coupling used in a conventional spur gear drive, indicating the difference in gear arrangement makes a negligible difference in the slip losses of the coupling.

In Fig. 5 curve D represents the required speed of the planetary ring gear or runner as used in the device of Fig. 1, whereas curve E was calculated to represent the required relative speed of the runner of a coupling used in a conventional spur gear arrangement. This curve indicates that conventionally arranged couplings must be driven at a higher speed to obtain the same resultant supercharger speed than in the case of the device illustrated in Fig. 1.

The above curves A, B, C, D and E were calculated from the assumption that the power required to drive the supercharger was as illustrated by curve F of Fig. 6, and the gear ratios were assumed to be 2.7:1 in the illustrated device of Fig. 1.

Curve C' in Fig. 4 shows the slip loss characteristics of a three-stage coupling unit, if an intermediate stage were introduced between the two stages of the device illustrated in Fig. 1. A further reduction in slip losses could thus be obtained if deemed desirable as indicated by this curve.

Obviously, the dimensions of parts, gear ratios and arrangement of gears may be varied to suit different requirements and applications, the proportioning of components of the devices here shown being exaggerated for purposes of illustration. Although Figs. 1 and 2 show the application of the coupling to planetary gear systems, the use is not limited thereto.

The invention described herein may be manufactured and used by or for the Government of the United States of America for governmental purposes without the payment of any royalties thereon or therefor.

What is claimed is:

1. A multi-stage hydraulic variable slip coupling having a driving means and a driven member, comprising a first stage driver geared to the driving means through an overrunning clutch, a first stage runner hydraulically driven by said first stage driver and geared to said driven member, at least one additional driver geared to the driving means to operate at successively relatively greater speeds than, and in the same direction as, said first stage driver for hydraulically driving said first stage driver and each successive stage driver, all drivers except that of the last stage being provided with overrunning clutches and runner vanes to permit their speeds being increased by the succeeding stage driver over the normal direct drive from the driving means through their respective overrunning clutches, and bleed means for each stage.

2. A multi-stage hydraulic variable slip coupling having a driving means and a driven member, comprising a first stage driver geared to the driving means through an overrunning clutch, a first stage runner hydraulically driven by said first stage driver and geared to said driven member, at least one additional driver geared to the driving means to operate at successively relatively greater speeds than, and in the same direction as, said first stage driver for hydraulically driving said first stage driver and each successive stage driver, all drivers except that in the last stage being provided with overrunning clutches and runner vanes to permit their speeds being increased by the succeeding stage driver over the normal direct drive from the driving means through their respective overrunning clutches, and common fluid supply passage means for the hydraulic fluid chambers to bring them successively into operation by overflow from the first-stage fluid chamber to the second stage fluid chamber and then to each succeeding chamber as the previous stage reduces its slip to a minimum, and bleed means for each stage.

3. In a hydraulic coupling, a drive shaft, a driven shaft, a driver forming a peripheral fluid chamber about said drive shaft and geared thereto to turn at any desirable gear ratio, a runner in said fluid chamber having a sun gear, planetary pinions meshing with said sun gear, a spider for said pinions mounted on said driven shaft, and a fixed ring-gear meshing with said pinions, means for admitting fluid to said fluid chamber, and bleed means for said chamber.

4. In a hydraulic coupling, a drive shaft, a driven shaft, a driver forming a peripheral fluid chamber rotatably mounted around said drive shaft, gear means including overrunning clutch means operatively connecting said driver to said drive shaft to be driven in the opposite direction therefrom, a runner in said fluid chamber having a rotatable ring-gear integral therewith, planetary pinions meshing with said ring gear, a spider for mounting said planetary pinions and rigidly mounted on said drive shaft, a sun gear on said driven shaft meshing with said planetary pinions, means for admitting a supply of operating fluid to said fluid chamber, said driver and runner constituting a first stage, a second stage, said second stage comprising a second runner formed on the first stage driver and forming therewith a second peripheral fluid chamber, overflow passages between said fluid chambers for delivering operating fluid to said second fluid chamber after said first fluid chamber is substantially filled, a second driver cooperating with said second runner, gearing between said drive shaft and said second driver to operate said second driver at a higher reverse speed than said first driver, said overrunning clutch means providing an arrangement whereby said first driver may be hydraulically driven by said second driver at a higher speed than the first driver is driven directly by said drive shaft, and bleed means for the fluid in each chamber.

5. In a hydraulic coupling, a drive shaft, a driven shaft, a driver forming a peripheral fluid chamber rotatably mounted around said drive shaft, gear means including overrunning clutch means operatively connecting said driver to said drive shaft to be driven in the opposite direction therefrom, a runner in said fluid chamber having a rotatable ring-gear integral therewith, planetary pinions meshing with said ring-gear, a spider for mounting said planetary pinions and rigidly mounted on said drive shaft, a sun gear on said driven shaft meshing with said planetary pinions, means for admitting a supply of operating fluid to said fluid chamber, said driver and runner constituting a first stage, a second stage, said second stage comprising a second runner formed on the first stage driver and forming therewith a second peripheral fluid chamber, overflow passages between said fluid chambers for delivering operating fluid to said second fluid chamber after said first chamber is filled, a second driver cooperating with said second runner, gearing between said drive shaft and said second driver to operate said second driver at a higher reverse speed than said first driver, said overrunning clutch means providing an arrangement whereby said first driver may be hydraulically driven by said second driver at a higher speed than the first driver is driven directly by said drive shaft, bleed means for the fluid in each chamber, friction clutch means between said first stage runner and said first driver normally released, and means responsive to fluid flow into said second chamber for operating said clutch means into engaged position for locking said first stage driver and runner members together when said second stage is brought into operation.

6. In a hydraulic coupling, a drive shaft, a driven shaft, a driver forming a peripheral fluid chamber rotatably mounted around said drive shaft, gear means including overrunning clutch means operatively connecting said driver to said drive shaft to be driven in the opposite direction therefrom, a runner in said fluid chamber having a rotatable ring-gear integral therewith, planetary pinions meshing with said ring-gear, a spider for mounting said planetary pinions and rigidly mounted on said drive shaft, a sun gear on said driven shaft meshing with said planetary pinions, means for admitting a supply of operating fluid to said fluid chamber, said driver and runner constituting a first stage, a second stage, said second stage comprising a second runner formed on the first stage driver and forming therewith a second peripheral fluid chamber, overflow passages between said fluid chambers for delivering operating fluid to said second fluid chamber after said first chamber is filled, a second driver cooperating with said second runner, gearing between said drive shaft and said second driver to operate said second driver at a higher reverse speed than said first driver, said overrunning clutch means providing an arrangement whereby said first driver may be hydraulically driven by said second driver at a higher speed than the first driver is driven directly by said drive shaft, bleed means for the fluid in each chamber, and one-way constraining means on said ring gear for preventing its initial turning in the direction of the drive shaft and providing for a minimum relative speed of operation of said driven shaft with respect to said drive shaft.

7. In a hydraulic coupling, a drive shaft, a driven shaft, a driver forming a peripheral fluid chamber rotatably mounted around said drive shaft, gear means including overrunning clutch means operatively connecting said driver to said drive shaft to be driven in the opposite direction therefrom, a runner in said fluid chamber having a rotatable ring-gear integral therewith, planetary pinions meshing with said ring-gear, a spider for mounting said planetary pinions and rigidly mounted on said drive shaft, a sun gear on said driven shaft meshing with said planetary pinions, means for admitting a supply of operating fluid to said fluid chamber, said driver and runner constituting a first stage, a second stage, said second stage comprising a second runner formed on the first stage driver and forming therewith a second peripheral fluid chamber, overflow passages between said fluid chambers for delivering operating fluid to said second fluid chamber after said first chamber is filled, a second driver cooperating with said second runner, gearing between said drive shaft and said second driver to operate said second driver at a higher reverse speed than said first driver, said overrunning clutch means providing an arrangement whereby said first driver may be hydraulically driven by said second driver at a higher speed than the first driver is driven directly by said drive shaft, bleed means for the fluid in each chamber, friction clutch means between said first stage runner and said first stage driver normally released, means responsive to fluid flow into said second chamber for operating said clutch means into engaged position for locking said first stage driver and runner members together when said second stage is brought into operation, and one-way constraining means on said ring gear for preventing its initial turning in the direction of the drive shaft and providing for a minimum relative speed of operation of said driven shaft with respect to said drive shaft.

8. In a hydraulic coupling, a drive shaft, a driven shaft, a driver forming a peripheral fluid chamber about said drive shaft, gear means including an overrunning clutch operatively connecting said driver to said shaft to turn said driver at any predetermined desirable gear ratio, a runner in said fluid chamber having a sun gear operatively connected thereto, planetary pinions meshing with said sun gear, a spider for said pinions mounted on said driven shaft, a fixed ring-gear meshing with said pinions, a second runner formed on the first stage driver and forming therewith a second peripheral fluid chamber, overflow passages between said fluid chambers, a second driver cooperating with said second runner, gearing between said drive shaft and said second driver to operate said second driver at a higher speed than said first driver, said overrunning clutch providing means whereby said first driver may be hydraulically driven by said second driver at a higher speed than said first driver is driven directly by said drive shaft, and bleed means for each fluid chamber.

9. In a hydraulic coupling, a drive shaft, a driven shaft, a driver forming a peripheral fluid chamber about said drive shaft, gear means including an overrunning clutch operatively connecting said driver to said shaft to turn said driver at any predetermined desirable gear ratio, a runner in said fluid chamber having a sun gear operatively connected thereto, planetary pinions meshing with said sun gear, a spider for said pinions mounted on said driven shaft, a fixed ring-gear meshing with said pinions, a second runner formed on the first stage driver and forming therewith a second peripheral fluid chamber, overflow passages between said fluid chambers, a second driver cooperating with said second runner, gearing between said drive shaft and said second driver to operate said second driver at a higher speed than said first driver, bleed means for each chamber, said overrunning clutch providing means whereby said first driver may be hydraulically driven by said second driver at a higher speed than said first driver is driven directly by said drive shaft, friction clutch means between said first stage runner and said first stage driver normally released, and means responsive to fluid flow into said second chamber for operating said clutch means into engaged position for locking said first stage runner and driver members together when said second stage is brought into operation.

GEORGE W. BALL.

REFERENCES CITED

The following references are of record in the file of this patent:

UNITED STATES PATENTS

| Number | Name | Date |
| --- | --- | --- |
| 1,962,972 | Stock | June 12, 1934 |
| 2,147,528 | Fottinger | Feb. 14, 1939 |
| 2,297,259 | Speiser | Sept. 29, 1942 |
| 2,323,592 | Gunberg | July 6, 1943 |
| 2,361,105 | Jandasek | Oct. 24, 1944 |
| 2,368,873 | Pollard | Feb. 6, 1945 |
| 2,385,834 | Nallinger | Oct. 2, 1945 |
| 2,400,540 | Chilton | May 2, 1946 |
| 2,415,760 | Porter | Feb. 11, 1947 |

FOREIGN PATENTS

| Number | Country | Date |
| --- | --- | --- |
| 407,146 | Great Britain | Mar. 15, 1934 |
| 363,358 | Italy | Dec. 24, 1938 |